Sept. 20, 1971  D. L. DAUBEN  3,605,893
SECONDARY RECOVERY PROCESS
Filed Nov. 28, 1969
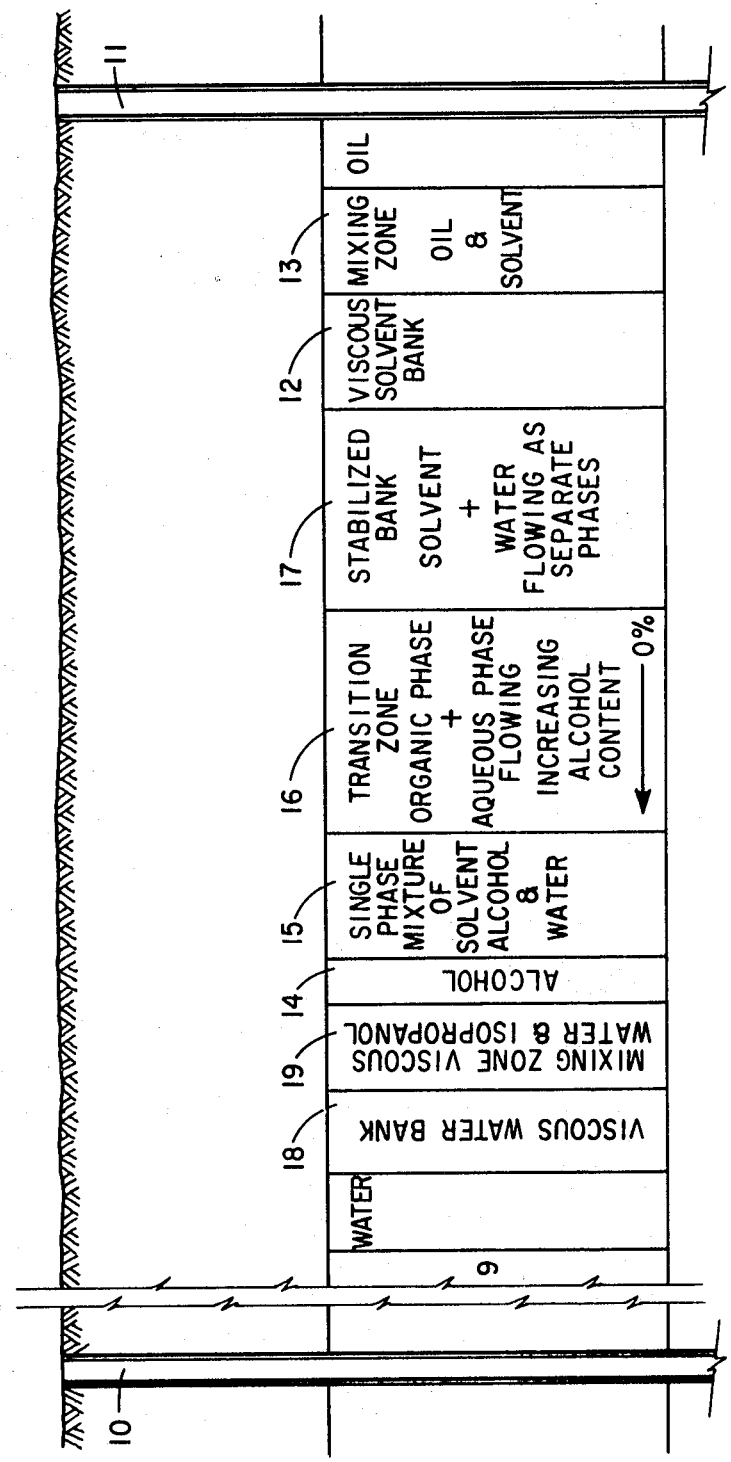
INVENTOR.
DWIGHT L. DAUBEN
BY
ATTORNEY United States Patent Office 3,605,893
Patented Sept. 20, 1971

3,605,893
SECONDARY RECOVERY PROCESS
Dwight L. Dauben, Tulsa, Okla., assignor to Amoco
Production Company, Tulsa, Okla.
Filed Nov. 28, 1969, Ser. No. 880,578
Int. Cl. E21b *43/22*
U.S. Cl. 166—273                               5 Claims

ABSTRACT OF THE DISCLOSURE

Oil is recovered from an underground oil-bearing formation by injecting into the formation in sequence three batches or slugs of liquid. These are first a liquid hydrocarbon; second, a mutual solvent for the liquid hydrocarbon and water; and, third, water with increased viscosity. The final slug is followed by ordinary drive water. The viscosities of the viscous water slug and hydrocarbon liquid are increased to values at least as great as the viscosity of the mutual solvent. Preferably, the hydrocarbon liquid is propane or butane with viscosity increased by the addition of a solution of polyisobutylene in a hydrocarbon having a higher molecular weight than butane.

---

Many processes have been proposed for recovering oil from oil-bearing earth formations. In one such process, a batch or slug of hydrocarbon liquid is injected through an injection well and into the formation to displace the oil toward a producing well through which the oil is removed to the surface. The slug of hydrocarbon liquid is followed by a slug of an amphipathic solvent, that is, a mutual solvent for the hydrocarbon liquid and water. The amphipathic solvent is, in turn, displaced through the formation by ordinary drive water, such as that used in regular waterflooding operations. Examples of such processes are described in U.S. Patents 2,742,089, Morse, 3,220,474, Holm, and 3,330,345, Henderson et al.

For purposes of convenience and simplicity, the hydrocarbon liquid will generally be referred to in the following description as a "solvent." The amphipathic or mutual solvent will ordinarily be referred to as an "alcohol" since that is what it usually is.

SUMMARY

I have found that the process described in the listed patents can be improved in three ways. First, the viscosity of a batch or slug of water immediately following the alcohol should be increased to at least the viscosity of the alcohol. Second, the viscosity of the solvent should be at least about the same as the alcohol viscosity. Third, the viscous solvent should preferably be a solution of polyisobutylene in a combination of propane or butane with higher molecular weight hydrocarbons. The viscosities should, of course, all be measured under reservoir conditions.

In the drawing, the single figure shows the various zones which move through the oil-bearing formation. The oil-bearing formation 9 is penetrated by an injection well 10 and a producing well 11. Oil is displaced into well 11 from an oil-bearing formation. Oil is produced to the surface through well 11. The oil is forced through the formation by a viscous solvent bank 12. A mixing zone 13 exists between the solvent and the oil. The solvent is, in turn, forced through the formation by an alcohol bank 14.

In the absence of water, the alcohol would force the solvent through the formation in a single-phase system. The alcohol, however, is amphipathic. That is, it is soluble in both water and solvent and the solvent and water are both soluble in the alcohol. Due to this amphipathic nature of the alcohol, a zone 15 exists immediately in front of the alcohol where a solution of alcohol, solvent and water are present in a single phase. As the distance from the alcohol bank increases in this single-phase system, the alcohol concentration decreases until, in zone 16, two phases exist. One is mostly solvent containing a little water and alcohol, while the other phase is mostly water with a little solvent and alcohol. The alcohol content continues to decrease at greater distances from the alcohol bank until, at the beginning of zone 17, the alcohol disappears. In zone 17, only solvent and water flow in a substantially constant ratio.

The solvent flowing in zone 17 displaces solvent in zone 12. The solvent in zone 12 displaces oil naturally present in the formation. A mixing zone 13 is present between the solvent and oil. Zones 12 and 13 in the drawing, and the oil zone, are shown in the conventional way, by indicating only the hydrocarbon content. It should be noted that water is also present in all these zones. In some miscible drive processes, this water does not move during the oil-recovery process, so there is little point in even showing its presence. When alcohol is used in the process, however, the water naturally present in the formation is displaced by the alcohol and does flow. While two immiscible phases flow in zones 16 and 17, it should be recognized that both phases are miscibly driven by the single-phase mixture in zone 15. In general, the organic phase flows through the oil-filled channels, while the water phase flows through the water-filled channels. Thus, two more or less independent miscible drives occur simultaneously, one for the oil and the other for the water.

Two effects should be explained. First, if the formation has not been waterflooded, the concentration of water in the transition zone and stabilized bank is higher than the original water concentration. Since the original water concentration is such that the water is immobile under existing pressure differentials, it is obvious that the water concentration must increase if the displaced water is to flow through the formation. The water saturation increases simply by immiscible displacement of solvent or oil by water. If the formation has been waterflooded, the oil saturation will be low and the water saturation will be high. In this case, the oil saturation will increase until both the water and oil flow at the rates at which they are displaced by the alcohol.

The second effect is an overrunning of solvent bank 12 and mixing zone 13 by displaced water. As noted in the table, the original immobile water saturation may be 30 or 40 percent of the pore volume. The original volume of injected viscous propane may be only 2 or 3 percent of the pore volume. It will be apparent that the 30 or 40 pore-volume percent of water quickly moves through the 2 or 3 percent pore volume occupied by the solvent. The water then flows into the oil-filled portion of the reservoir immiscibly displacing some of the oil as in an ordinary water drive. The solvent bank then follows along through the remaining oil-filled channels miscibly displacing the remaining oil.

Alcohol bank 14 is forced through the formation by viscous water bank 18. There is, of course, a single-phase mixing zone 19 between the alcohol and water.

Finally, the viscous water bank 18 is displaced through the formation by water as shown. There is a zone of decreasing viscosity between the viscous water and the ordinary flooding water. This has not been shown in the drawing since it is not really a mixing zone of different materials, but is simply a zone in which the viscosity-increasing agent changes in concentration.

There are actually only three banks of materials injected through well 10 between the oil and final driving water. These are a viscous solvent, an alcohol, and viscous water. All other zones shown in the drawing form automatically as the three injected banks or slugs flow through the formation. The nature and actions of the viscous solvent are the most complex, so this viscous solvent bank will be considered first.

Results of flow tests are presented in the following table, together with most of the test conditions.

TABLE

| Run No. | Core | Initial saturation | | Solvent properties | | | Fractional flows | | Trans. zone length (ft.) | Solvent recovery (Cum. percent to end of ea. zone) | | | |
|---|---|---|---|---|---|---|---|---|---|---|---|---|---|
| | | Brine | Solvent | Visc., cp., 75° F. | Composition | | $f_w$ stab. bank | $f_w$ trans. zone | | Lead bank | Stab. bank | Trans. zone | Ulti-mate |
| 1 | 1 | .349 | .651 | .48 | 28% benzene, 72% heptane | | .61 | .754 | 1.9 | 57.8 | 64.9 | ---- | 100 |
| 2 | 2A | .398 | .602 | .50 | 45% benzene, 72% heptane | | .55 | .701 | 4.2 | 62.8 | 68.6 | 80.0 | 100 |
| 3 | 2A | .319 | .681 | .54 | 75% benzene, 25% heptane | | .48 | .623 | 3.0 | 57.8 | 64.4 | 73.4 | 100 |
| 4 | 2A | .368 | .632 | [1] 2.2 | ----do---- | | .55 | .563 | 3.8 | 55.4 | 66.1 | 76.5 | 100 |
| 5 | 2A | .534 | .466 | .54 | ----do---- | | .54 | .553 | 4.0 | 0.0 | 34.7 | 53.4 | 100 |
| 6 | 2A+4 | .386 | .614 | [2] 5.6 | ----do---- | | .60 | .431 | [3] 5.1 [4] 11.0 | 56.0 | 67.3 | 82.3 | 100 |

Additional details

Test temperature ---------------- 75° F. except for Run 1 (160° F.).
Procedure ---------------- Continuous injection of isopropanol to displace solvent and brine at 2 ft./day.

Core details ---------------- Number

| | Length | Pore volume (cc.) |
|---|---|---|
| 1 | 7.01′ | 943.2 |
| 2A | 15.24′ | 2,021.3 |
| 2A+4 | 28.24′ | 3,764.9 |

Core type ---------------- Torpedo sandstone.
Brine ---------------- 14,600 p.p.m. NaCl, 1,500 p.p.m. CaCl$_2$.

[1] Contains .363 wt. percent Enjay Vistenex L200 polyisobutylene (molecular wt. about 200,000).
[2] Contains .55 wt. percent BASF Oppanol B-200 polyisobutylene (molecular wt. about 200,000).
[3] At 15.2′.
[4] At 28.2′.

In Run 1, the core was short. This run is included to show that after moving a short distance, the transition zone length is still short. This is also shown in Run 6. A comparison of Tests 2 and 3 shows the solvent composition can affect the transition zone length even though the viscosities are about the same. Run 5 is included to show that the process is effective even when the oil saturation of the formation has been greatly reduced by waterflooding, for example.

Conditions in Runs 3, 4 and 6 are quite similar except that in Runs 4 and 6 the viscosity of the solvent was increased by the addition of polyisobutylene having a molecular weight of about 200,000, as measured by the Staudinger specific viscosity method. (By other methods, molecular weights as much as several million were indicated.) It will be noted that the increase in viscosity increased the transition zone length. Increasing the viscosity made little difference in the percent solvent recovery at the end of the stabilized bank which is the point where isopropanol appeared. This is contrary to earlier results by other workers who used different solvents to achieve different viscosities. The differences shown previously are thought to have been due mostly to differences in phase behavior of the various solvents rather than to differences in viscosities. In the runs reported in the table, differences in phase effects were eliminated by use of the same solvent. Differences in viscosity were achieved by adding amounts of polymer too small to affect phase behavior. When these precautions were taken, the differences in solvent recovery at the end of the stabilized bank became very small.

These observations show that the viscosity of the solvent bank should not be adjusted in accordance with the solvent recovery effects, as indicated in the prior art. Instead, the viscosity should be controlled by considerations of sweep efficiency and transition zone length. The principal reason why sweep efficiency and transition zone length are important is that costs of even the least expensive alcohol—isopropanol—is much more than the cost of solvents such as condensates containing heptane, benzene, and the like. This observation requires some further explanation.

Suppose, for example, that a heptane-benzene mixture is used as the solvent bank. The viscosity is about 0.54 centipoise. When this solvent displaces crude oil through the formation, the resistance to flow of the solvent through the formation is small. Thus, the solvent flows through a channel of narrow width along a line connecting the injection well to the producing well. Isopropanol is more viscous, the resistance to flow is greater and the channel of flow is wider. In the edges of this wider channel, the alcohol directly contacts the crude oil, thus losing the advantage of having the oil displaced by the solvent and then the solvent being displaced by the alcohol. In other words, the expensive alcohol is not used most efficiently if the viscosity of the alcohol is greater than the viscosity of the solvent.

Suppose, next, that the viscosity of the solvent is greater than the viscosity of the alcohol. In this case, the transition zone becomes longer, requiring more alcohol. Again, the expensive alcohol is used inefficiently. In this case, however, the disadvantage is offset to at least some degree by the shorter mixing zone between the solvent and oil.

In addition, the higher solvent viscosity causes a wider sweep path for the solvent so more oil is recovered. The higher solvent viscosity also produces a better distribution of the solvent vertically among zones of different permeabilities.

Considering all the effects of changing the solvent viscosity, I have found that this viscosity should be at least as great as the alcohol viscosity and, in some cases, may be considerably more. Preferably, however, the solvent viscosity should be substantially the same as the alcohol viscosity.

The higher solvent viscosity may be obtained by using solvents which are naturally more viscous than heptane, benzene, or the like. It is greatly preferred, however, that low molecular-weight relatively non-viscous hydrocarbons, such as propane or butane, be used because of their better phase relationships with the alcohols and water. This is explained, for example, in U.S. Patent 3,330,345, Henderson et al. As also suggested by Henderson et al., the viscosities of at least some of the solvents can be increased by the addition of polymers. Two difficulties have arisen, however. First, the most desirable solvents are propane and butane, both from the standpoint of phase behavior and cost. Few polymers are sufficiently soluble in these very low-molecular weight hydrocarbons to provide the desired viscosities. Second, polymers which are more effective as viscosity increasers than those suggested in the past are rather badly needed.

Polyisobutylene has been found to be a very effective viscosity increaser for hydrocarbon solvents. It has the advantage of being so inert that it has a very low rate of loss to formation surfaces by adsorption. Polymers having molecular weights in the range from about 70,0000 to about 200,000, as measured by the Staudinger specific viscosity method, are preferred.

Unfortunately, the polyisobutylenes, like other polymers, have very low solubilities in propane and butane. This difficulty can be overcome by dissolving the polymers first in higher molecular-weight hydrocarbons, such as natural gasoline, and then diluting this solution with propane, butane, or mixtures of light hydrocarbons. Preferably, the heavier hydrocarbon polymer solvent should contain aromatic hydrocarbons since these are good polymer solvents and improve the phase relationships with alcohol and water.

Again because of the high cost of the alcohol, the length of the mixing zone with the following water should be small. I accomplish this object by increasing the viscosity of a bank or slug or batch of water in contact with the alcohol. The viscosity of this water slug is increased to at least the viscosity of the alcohol to avoid the possibility that the width of the alcohol flow channel may be greater than the width of the water flow channel. In general, the greater the viscosity of the water, the shorter is the mixing zone with alcohol. It should be noted, however, that the greater the viscosity of the viscous water slug, the greater is the amount and cost of the viscosity-increasing agent. In addition, the higher the viscosity of the viscous water slug, the greater is the tendency of the following unthickened water to finger through the thickened slug. This increases the "mixing zone" between the thickened and unthickened water which increases the required size and cost of the slug of viscous water. For these reasons, the viscosity of the slug of thickened water should rarely be more than two or three times the viscosity of the alcohol.

The viscous water slug can be prepared by dissolving various gums or polymers in the water. These may include polysaccharides, such as those described in U.S. Patent 3,372,749, Williams, or modified polysaccharides, such as those described in U.S. Patents 2,373,810, Williams, and 3,436,346, Westover et al. The thickening agents may also be the partially hydrolyzed polyacrylamides and their water-soluble salts, such as those described in U.S. Patent 3,039,529, McKennon. Flaxmeal gum, as described in U.S. Patent 3,338,304, Lummus is preferred, particularly where high loss of the thickening agent by adsorption on formation surfaces is a major problem. Still other suitable thickening agents will occur to those skilled in the art.

The amphipathic solvent for the hydrocarbon solvent and water has been referred to generally as an alcohol. Any of the other types of mutual solvents for hydrocarbons and water can be used. Many, such as acetone, dioxane, and the like, have been suggested in the prior art. Some of these, such as acetone, have rather low viscosities. It will usually be desirable to increase the viscosities of such liquids. This can be done by adding polymers, such as the methyl-vinyl ethers, methyl methacylates, ethyl cellulose, or the like. Still other suitable polymers will occur to those skilled in the art.

The alcohols have higher viscosities, so there is less need for increasing their viscosity. In some cases, however, polymers such as those mentioned above, or polyvinyl pyrrolidones can be added even to the alcohols. This may be desirable, for example, if the oil in the reservoir has a viscosity above about 5 to 10 centipoises.

My process will be better understood from the following example. A shallow oil-bearing formation has a temperature of only about 75° F. and a pressure of about 400 pounds per square inch. It is decided to use my process to recover the oil from this formation. Available in the area are isopropanol, butane, and a light hydrocarbon solvent called "Dripolene," containing aromatic and other cyclic hydrocarbons. The viscosity of the alcohol at 75° F. is found to be about 2.2 centipoises. A few tests show that this viscosity can be matched by a solution containing about 0.72 percent by weight of polyisobutylene having a molecular weight of about 200,000 (Staudinger) in a solvent containing 70 percent butane and 30 percent "Dripolene." The pore volume expected to be flooded, including the water-filled pore volume, is about 400,000 barrels (42 U.S. gallons per barrel).

Frst, 22,000 pounds of the polyisobutylene are dissolved in 3,600 barrels of "Dripolene." Then, this solution is diluted under pressure with 8,400 barrels of butane to form the viscous solvent slug having a volume about 3 percent of the pore volume expected to be flooded. This slug is injected into the formation and is followed by about 12,000 barrels of isopropanol.

Next, flaxmeal is mixed into water in an amount of about 5 pounds of flaxmeal per barrel of water. The mixture is allowed to settle and the liquid is drawn off the settled solids. This liquid is then passed through a mixed-bed filter with coarse filter material first. The resulting solution has a viscosity of about 3.0 centipoises at 75° F. About 20,000 barrels of the flaxmeal gum solution are mixed and injected into the formation. This is followed by ordinary driving water.

In the example, the volumes of viscous solvent and alcohol were about 3 percent of the pore volume expected to be flooded. When the viscosities of the solvent, alcohol and water are closely matched, the mixing zones should theoretically be negligible in size. Actually, they are not. In order to take care of the actual mixing zones, together with the transition zone and stabilized bank, the volumes of the solvent and of the alcohol should each be at least about 2 percent of the pore volume expected to be flooded, and preferably at least about 3 percent of this volume. More than about 5 percent is rarely needed, but may be used if desired. The viscous water bank, being displaced by less viscous driving water, should be somewhat larger in order to prevent too rapid penetration and dilution of the viscous water by the driving water. A volume of at least 3 or 4 percent, and preferably about 5 or 6 percent of the pore volume expected to be flooded is suggested for the viscous water slug.

These volumes are applicable to operations in which it is desired that a miscible drive continue from the injection well to the producing well. As little as 10 or 20 barrels each of the viscous solvent, alcohol, and viscous water may be used to displace residual oil from the formation surrounding a water-injection well in a regular waterflooding operation. In such cases, the drive loses its miscible character a few feet from the well, becoming a two-phase immiscible drive system. Small treatments have the advantage, however, of making the entire pore space near the injection well available for flow of injected water.

Still other variations and alternates will be apparent to those skilled in the art. Therefore, I do not wish to be limited to the descriptions and examples which are given, but only by the following claims.

I claim:

1. In a method for recovering oil from an underground oil-bearing earth formation penetrated by an injection well and a producing well, in which method a hydrocarbon solvent selected from the group consisting of propane, butane and mixtures of propane and butane is injected into said formation through said injection well and is followed by a mutual solvent for water and for said hydrocarbon solvent, said mutual solvent being, in turn, displaced through the formation by water, the improvement comprising increasing the viscosity of said hydrocarbon solvent by the addition of a solution of a polymer in a hydrocarbon liquid having a molecular weight higher than that of butane, the molecular weight of said polymer being in the range from about 70,000 to about 200,000 as measured by the Staudinger specific viscosity method.

2. The method of claim 1 in which said mutual solvent is an alcohol.

3. The method of claim 2 in which said alcohol is isopropanol.

4. The method of claim 1 in which said polymer is polyisobutylene.

5. In a method for recovering oil from an underground oil-bearing earth formation penetrated by an injection well and a producing well, in which method a hydrocarbon solvent selected from the group consisting of propane, butane and mixtures of propane and butane is injected into said formation through said injection well and is followed by isopropanol which is, in turn, displaced through the formation by water, the improvement comprising increasing the viscosity of said isopropanol by dissolving a polymer in said isopropanol, and increasing the viscosities of the water immediately following the isopropanol and of the hydrocarbon solvent to at least the viscosity of said isopropanol containing the dissolved polymer, the viscosity of said hydrocarbon solvent being increased by the addition of a solution of polyisobutylene in a hydrocarbon liquid having a molecular weight higher than that of butane, the molecular weight of said polyisobutylene being in the range from about 70,000 to about 200,000 as measured by the Staudinger specific viscosity method.

References Cited

UNITED STATES PATENTS

| | | | |
|---|---|---|---|
| 2,742,089 | 4/1956 | Morse et al. | 166—273 |
| 3,181,609 | 5/1965 | Csaszar et al. | 166—273 |
| 3,240,272 | 3/1966 | Orkiszewski | 166—274 |
| 3,324,944 | 6/1967 | Poettmann | 166—273 |
| 3,330,345 | 7/1967 | Henderson et al. | 166—273 |
| 3,334,688 | 8/1967 | Blackwell et al. | 166—273 |
| 3,497,007 | 2/1970 | Williams et al. | 166—273 |

IAN A. CALVERT, Primary Examiner